April 24, 1962     G. WYSOWSKI     3,030,994

MEAT CARVING BOARD

Filed Jan. 11, 1960

GEORGE WYSOWSKI
             INVENTOR.

BY Z. O. St. Palley
    Patent Agent

United States Patent Office 3,030,994
Patented Apr. 24, 1962

3,030,994
MEAT CARVING BOARD
George Wysowski, 27 Neck Road, Clinton, Conn.
Filed Jan. 11, 1960, Ser. No. 1,673
2 Claims. (Cl. 146—215)

My invention relates to improvements in meat carving boards.

Meat carving boards or roast boards in which the meat to be carved is rotatably secured by means of prongs carried by a ring are known in the art. It is also known that the customary meat carving boards of this type have the following disadvantages: the possibility of an accidental detachment of the ring, together with the prongs and the meat, from the board, and the presence of metallic screws or clamps secured to the board for the purpose of holding the ring, which may cause injury to the hands when cleaning the board.

One of the important objects of my invention is to provide a meat carving board in which the ring carrying the prongs is rotatably secured to the board without the application of any screws, clamps, metallic or other objects which can injure the hands when cleaning the carving board.

Another important object of my invention is to provide a meat carving board in which the ring carrying the prongs can be very easily detached and removed from the board for the necessary cleaning operation. This detachment and removal, however, is possible only when there is no meat on the prongs, as in my invention the ring carrying the prongs is so constructed that when the meat to be carved is deposited on the prongs, it will automatically prevent the disengagement of the rotatable ring from the carving board.

A further object of my invention is to provide a meat carving board in which the juices from the meat are readily drained and collected.

It is known that screws and nails driven into the working surface of a carving board will cause microscopic cracks in the wood which permit the accumulation of bacteria, therefore, the total absence of screws or nails in the working surface of my invention represents a definite advantage from a sanitary standpoint.

Other objects and advantages of my invention will be apparent during the course of the following description.

Figure 1:
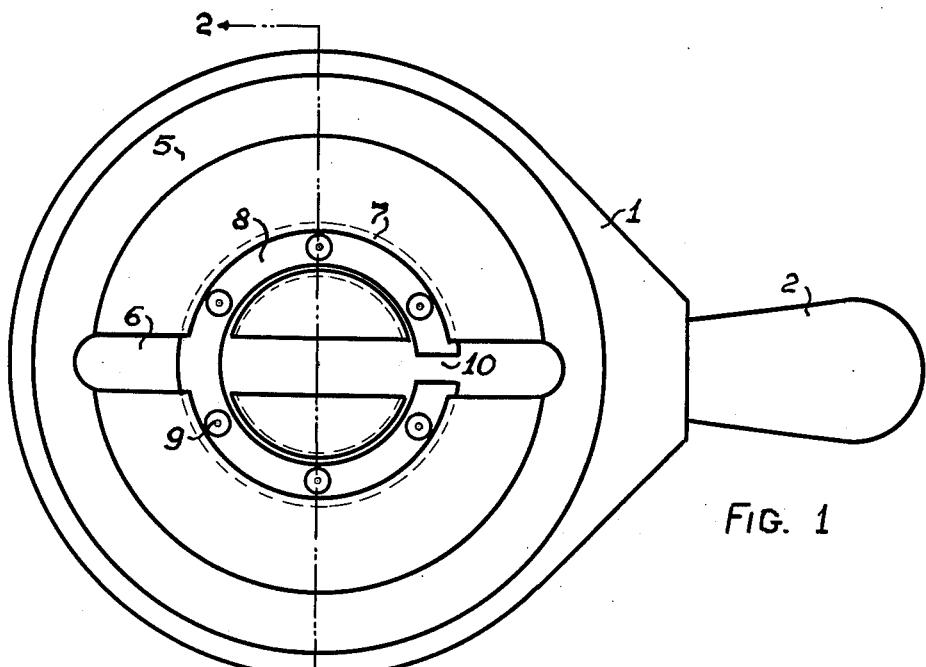
Figure 2:
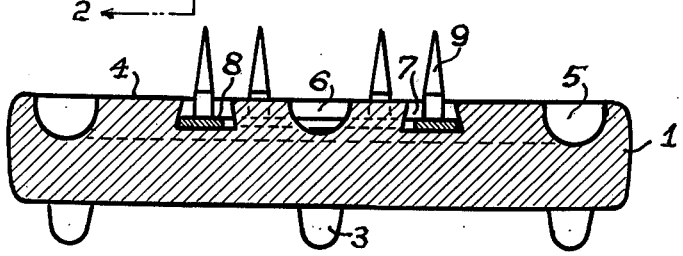
Figure 3:
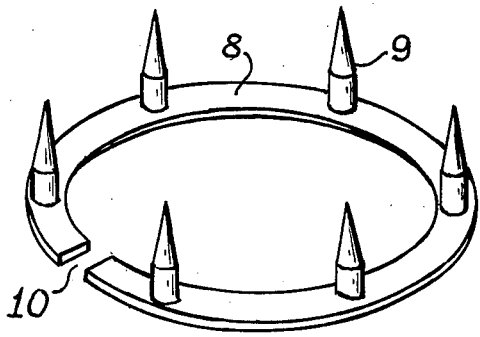

In the accompanying drawing, forming a part of the present application, wherein for the purpose of illustration is shown a preferred form of my invention, FIGURE 1 is a plan view of the preferred form of my meat carving board, FIGURE 2 is a sectional view of the same taken along the line 2—2 of FIGURE 1, FIGURE 3 is a perspective view of the ring and the prongs forming the meat mounting means.

Referring to the drawing, the FIGURE 1 represents the meat carving board preferably made of wood and has the shape illustrated in FIGS. 1 and 2. In this preferred form the carving board is provided with a handle 2, and is supported by the legs 3. In alternative form of my invention the shape of the carving board, the handle and the supports may vary, as well as the type of material employed in their construction.

The upper or working surface 4 of the carving board is provided with a juice collecting groove 5, disposed adjacent to the periphery of the board 1 (see FIG. 1), which is circular in shape and is intersected by a cross groove 6, diametrically arranged. In alternative forms of my invention these grooves may have different shapes and arrangements, also more than one cross groove may be employed.

Centrally located in the working surface of the carving board is the circular dove-tail groove 7 having inwardly sloping sides. This circular groove 7 is bisected by the cross groove 6 so as to insure the proper draining of the meat juices into the outer groove 5.

Disposed in this circular dove-tail groove 7 is a circular ring 8 of resilient material, carrying the prongs 9 used for the mounting of the meat to be carved. The ring 8 is interrupted by a gap 10 permitting the compression of the ring to a smaller overall size.

The essential feature of my invention is that the ring 8 is so dimensioned that its overall diameter is just slightly smaller than the maximum diameter of the base of the ring 7, but it is too large to permit the removal of the ring 8 from the groove 7 because of the sloping outer side wall of the dove-tail groove 7. Also, the radial width of the ring 8 is somewhat less than the minimum distance between the converging side walls of the dove-tail groove 7. As a result of these characteristics, the ring 8, carrying the prongs 9, can be freely rotated in the dove-tail groove 7 without any possibility of being detached from the board. When, however, the ring 8 is compressed, by the application of pressure on the prongs 9 adjacent to the gap 10, the ring 8 can be conveniently removed from the dove-tail groove 7.

In the operation of my meat carving board this arrangement offers the great convenience that the meat mounted on the prongs can be rotated for easier carving without the danger of detaching the meat from the board, because, as long as the meat is mounted on the prongs 9 the ring 8 cannot be compressed, hence it cannot be removed from the dove-tail groove 7. Thus, in my invention the meat itself serves as a safety lock to prevent its accidental detachment from the carving board.

On the other hand, after the meat is removed from the prongs, the ring 8 can be conveniently detached from the dove-tail groove by applying pressure on the two prongs disposed adjacent to the gap 10 of the ring. This and the fact that the working surface of the carving board contains no screws or nails which may injure the hands or cause microscopic cracks in the wood, likely to collect bacteria, insures the easy and thorough cleanability of my device.

It is to be understood that the form of my invention, herein described and illustrated is to be considered only as a preferred example of the same, and that various changes in the shape, size, and arrangement of the parts may be resorted to, without departing from the spirit of my invention or the scope of the subjoined claims.

I claim:

1. A meat carving board having a circular dove-tail groove with inwardly sloping outer side wall; an interrupted circular ring of resilient material rotatably disposed within said groove, said ring being dimensioned so as to be normally retained in said groove by the inwardly sloping outer wall of the groove, but said ring is removable from the groove when said ring is compressed; a multiplicity of meat carrying prongs mounted on said ring, extending above the top of said groove so arranged as to prevent the compression of said ring when said prongs are thrust into a piece of meat.

2. A carving board having a circular groove with inwardly sloping outer side wall; a compressible interrupted circular ring rotatably disposed within said groove, said ring being dimensioned so as to be retained within the groove by said inwardly sloping outer wall of the groove when said ring is uncompressed, and to be removable from said groove when said ring is compressed; a multiplicity of meat carrying prongs secured to said ring and extending above the top surface of the board, two of said prongs being located on the opposite sides of the interruption of the ring preventing the compression of the ring when meat is mounted on these prongs.

References Cited in the file of this patent

UNITED STATES PATENTS

| | | |
|---|---|---|
| 2,620,003 | Perdue | Dec. 2, 1952 |
| 2,751,951 | Strathaus | June 26, 1956 |